United States Patent
Oh et al.

(10) Patent No.: US 9,470,788 B2
(45) Date of Patent: Oct. 18, 2016

(54) LANE RECOGNITION METHOD AND SYSTEM

(71) Applicant: Hyundai Motor Company, Seoul (KR)

(72) Inventors: Young Chul Oh, Gyeonggi-do (KR); Byungyong You, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 721 days.

(21) Appl. No.: 13/724,248

(22) Filed: Dec. 21, 2012

(65) Prior Publication Data
US 2014/0118182 A1     May 1, 2014

(30) Foreign Application Priority Data
Oct. 26, 2012 (KR) .......................... 10-2012-0119992

(51) Int. Cl.
*G01S 13/86* (2006.01)
*G01S 13/93* (2006.01)
*G01S 13/42* (2006.01)
*G01S 13/52* (2006.01)

(52) U.S. Cl.
CPC ............ *G01S 13/867* (2013.01); *G01S 13/931* (2013.01); *G01S 13/42* (2013.01); *G01S 13/52* (2013.01); *G01S 2013/9339* (2013.01); *G01S 2013/9375* (2013.01)

(58) Field of Classification Search
CPC .. G01S 17/023; G01S 13/867; G01S 17/936; G01S 13/931; G01S 15/931; G01S 2013/9375; G01S 13/42; G01S 13/52; G01S 2013/9339
See application file for complete search history.

(56) References Cited

U.S. PATENT DOCUMENTS

| | | | | |
|---|---|---|---|---|
| 6,035,053 A * | 3/2000 | Yoshioka et al. | ............. | 382/104 |
| 6,138,062 A * | 10/2000 | Usami | ............. | 701/23 |
| 7,792,327 B2 * | 9/2010 | Fujimoto | ............. | 382/104 |
| 8,040,253 B2 * | 10/2011 | Kaller et al. | ............. | 340/903 |
| 8,410,919 B2 * | 4/2013 | Kataoka | ............. | 340/435 |
| 8,457,359 B2 * | 6/2013 | Strauss et al. | ............. | 382/104 |
| 8,462,988 B2 * | 6/2013 | Boon | ............. | 382/104 |
| 2004/0167717 A1 * | 8/2004 | Buchanan et al. | ............. | 701/301 |
| 2004/0178945 A1 * | 9/2004 | Buchanan | ............. | 342/70 |
| 2008/0040039 A1 * | 2/2008 | Takagi | ............. | 701/300 |
| 2011/0313665 A1 * | 12/2011 | Lueke et al. | ............. | 701/301 |

FOREIGN PATENT DOCUMENTS

| | | |
|---|---|---|
| JP | H05342500 A | 12/1993 |
| JP | H1031799 A | 2/1998 |
| JP | 10-325869 A | 12/1998 |
| JP | 2001-124570 A | 5/2001 |

(Continued)

*Primary Examiner* — Matthew M Barker
(74) *Attorney, Agent, or Firm* — Mintz Levin Cohn Ferris Glovsky and Popeo, P.C.; Peter F. Corless (57) ABSTRACT

Disclosed herein is a method of recognizing the location of a current lane in which a vehicle is traveling, using a radar and an imaging device. The method includes: detecting the locations of the fixed objects using an object detector; capturing a photograph of the road surface ahead using an imaging device; calculating, by a controller, the entire width of a traveling road based on the locations of the fixed objects at the left side and the right side; calculating, by the controller the width of a traveling lane from the photograph of the road surface; and calculating, by the controller, the lane in which the vehicle is traveling based on the calculated width of the traveling lane and the entire width of the traveling road.

14 Claims, 4 Drawing Sheets

(56) References Cited

FOREIGN PATENT DOCUMENTS

| JP | 2002-225657 A | 8/2002 |
|----|---------------|--------|
| JP | 2005-010892 A | 1/2005 |
| JP | 2007-310595 A | 11/2007 |
| JP | 2008-273251 A | 11/2008 |
| JP | 2009-211715 A | 9/2009 |
| JP | 2009-252198 A | 10/2009 |
| JP | 2011-048641 A | 3/2011 |
| JP | 2012-089005 A | 5/2012 |
| KR | 10-2012-0046543 | 5/2012 |

* cited by examiner

LANE RECOGNITION METHOD AND SYSTEM

CROSS-REFERENCE TO RELATED APPLICATION

This application claims priority to and the benefit of Korean Patent Application No. 10-2012-0119992 filed in the Korean Intellectual Property Office on Oct. 26, 2012, the entire contents of which are incorporated herein by reference.

BACKGROUND OF THE INVENTION (a) Field of the Invention

The present invention relates to a lane recognition system and method of recognizing a lane where a vehicle is traveling, using a radar and an imagine device.

(b) Description of the Related Art

In general, a driver drives a vehicle while remaining within the boundaries of a traffic lane without deviating from the lane to prevent a potential traffic accident that may occur when the vehicle deviates from the lane. However, during bad weather conditions or if a driver dozes at the wheel the risk of a traffic accident may increase due to deviation from the traffic lane boundaries.

Various systems for recognizing a lane which help a driver not deviate from a lane have been developed using a system that recognizes the traffic. However, the system for recognizing a lane according to an embodiment of the related art generally uses a GPS and map data. In other words, a GPS is used for the system for recognizing a lane according to an embodiment of the related art generally have an error of several meters to tens of meters (e.g., about 5~15 m), such that there is a limit in accurately recognizing a lane due to errors accumulated in accordance with the distance from a base station.

Further, the system for recognizing a lane according to an embodiment of the related art obtains the information about the location of a vehicle based on the GPS information, however the system cannot recognize which lane the vehicle travels in and cannot appropriately help the driver change the traffic lane in driving on an unfamiliar road or at a complicated crossroad.

The above information disclosed in this section is only for enhancement of understanding of the background of the invention and therefore it may contain information that does not form the prior art that is already known in this country to a person of ordinary skill in the art.

SUMMARY

The present invention has been made in an effort to provide a method of recognizing a lane and a system thereof having advantages of being able to recognize the locations of fixed obstacles (e.g., a guard rail and a central reservation), using a radar, calculate the entire width of a traveling directional road from a guard rail or a central reservation, detect the width of the current lane, using an imaging device, and recognize the number of all of lanes of the traveling directional road and the lane within which the vehicle is traveling, from the information.

According to an exemplary embodiment of the present invention, a lane recognition method that recognizes a lane within which a vehicle is traveling, using an object detector, which detects the locations of fixed objects at the left side and the right side of a traveling directional road, and an imaging device, which takes a photograph of a road surface ahead, may include: determining the locations of the fixed objects by using the object detector; capturing a photograph of the road surface ahead by using the imaging device; calculating the entire width (Width) of a traveling road based on the locations of the fixed objects at the left side and the right side; calculating the width of a traveling lane (Lane_W) from the photograph of the road surface; and calculating the lane (Current_Lane) within which the vehicle is traveling based on the calculated width of the traveling lane (Lane_W) and the entire width of the traveling road.

The object detector may be a radar using the Doppler effect, in which determining the locations of the fixed objects may include: calculating the inter radar beam angle made by radar beams reflected and received from the fixed objects at the left side and the right side at a predetermined distance ahead of the vehicle; detecting left and right angles (Angle_L and Angle_R) of the driving direction of the vehicle and the radar beams reflected and received from the fixed objects at the left side and the right side at a predetermined distance ahead of the vehicle; and calculating the locations of the fixed objects based on the inter radar beam angle and the left and right angles.

The left fixed object may be a central reservation and the right fixed object may be a guard rail, in which the method may further include finishing recognizing a traveling lane, when the radar beam is not received.

The calculating of the entire width of the traveling road may include: calculating the distances (Distance_L and Distance_R) between the radar and the left and right fixed objects from the reflected and received radar beams; and determining the entire width (Width) of the traveling road from the following equation having the calculated distances between the radar and the left and right fixed objects and the left and right angels, as variables.

$$\text{Width}=(\text{Distance\_}L*\sin(\text{Angle\_}L))+(\text{Distance\_}R*\sin(\text{Angle\_}R))$$

The calculating of a lane within which the vehicle is traveling may include calculating the number (Total_Lane) of all the traveling lanes based on the calculated width of the traveling lane (Lane_W) and entire width of the traveling road.

The calculating of the number (Total_Lane) of all the lanes of the traveling road may have the integer of the quotient obtained by dividing the entire width (Width) of the traveling road by the width of the traveling lane (Lane_W) as the number of all the lanes (Total_Lane.)

The calculating of the lane (Current_Lane) within which the vehicle is traveling may use the following equation for the calculation.

$$(\text{Current\_Lane}-0.5)*\text{Lane\_}W=\text{Distance\_}L*\sin(\text{Angle\_}L)$$

According to another exemplary embodiment of the present invention, a lane recognition method that recognizes a lane within which a vehicle is traveling, using an object detector, which detects the location of a central reservation on a traveling directional road, and an imaging device, which captures a photograph of a road surface ahead, may include: detecting the location of the central reservation by using the object detector; taking a photograph of the road surface ahead by using the imaging device; calculating the width of a traveling lane (Lane_W) from the photograph of the road surface; calculating the lane (Current_Lane) within which the vehicle is traveling based on the calculated width of the traveling lane (Lane_W) and the location of the central reservation.

According to another exemplary embodiment of the present invention, a system for recognizing a lane may include: an object detector mounted on a vehicle and detects the locations of fixed objects at the left side and the right side of a road; an imaging device mounted on the vehicle and takes a photograph of the road surface of the road; and a controller that recognizes the lane within which the vehicle is traveling, from signals from the object detector and the imaging device, in which the controller is one or more processors or microprocessors operated by a predetermined program, and the program is composed of a series of commands for performing the method according to an exemplary embodiment of the present invention.

As described above, according to an exemplary embodiment of the present invention, it is possible to recognize the current lane where a vehicle is traveling, using an object detector (e.g., a radar) and an imaging device (e.g., a camera) which are mounted on the vehicle, without help of a map, a GPS, and an infrastructure for recognizing lanes.

Further, according to an exemplary embodiment of the present invention, since it is possible to recognize the number of all lanes on a traveling directional road (e.g., one way) and which lane a vehicle is traveling in, the present invention can be effectively used for a road guide system (e.g., a navigation device) and a lane change support system.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The characters L and R used with reference numerals throughout the specification mean the left and the right, respectively, if not specifically stated. When a part includes a component throughout the specification, it means the part may further include another component, not excluding another component, if not specifically stated.

Figure 1:
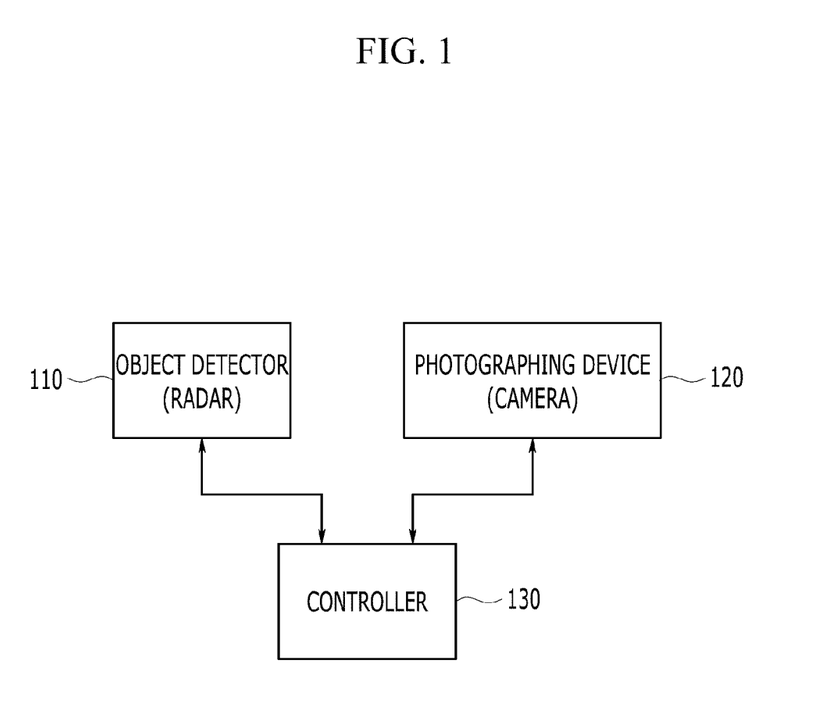
FIG. 1 is an exemplary diagram illustrating the configuration of a system for recognizing a lane according to an exemplary embodiment of the present invention.

FIG. 1 is an exemplary diagram illustrating the configuration of a system for recognizing a lane according to an exemplary embodiment of the present invention.

A system for recognizing a lane according to an exemplary embodiment of the present invention includes a system for recognizing a lane which recognizes the number of all lanes of a traveling directional road (e.g., one way) and the lane in which the vehicle is traveling.

The system for recognizing a lane according to an exemplary embodiment of the present invention may include an object detector 110 mounted on a vehicle 100 and is configured to detect the location of a plurality of fixed objects 10L and 10R located on the left side and/or the right side of a road; an imaging device 120 mounted on the vehicle 100 and is configured to capture a photograph of a road surface, and a controller 130 configured to recognize the current lane in which the vehicle 100 is traveling based on a signal of the imaging device 120.

The object detector 110, in an exemplary embodiment of the present invention may be implemented by a radar (or a radar sensor) that are widely used to sense a fixed object and/or a moving object, using the Doppler effect of a reflecting wave, for example, or may be implemented by a radar scanner corresponding to the radar, as another example, but the scope of the present invention is not limited thereto. As the object detector, the configuration and operation of the radar are apparent to a person of an ordinary skill in the art, so the detailed description thereof is not provided.

The imaging device 120 may be implemented by a video camera including a CCD (Charged Coupled Device) that is widely used, as an example in an exemplary embodiment of the present invention, but the scope of the present invention is not limited thereto. As the imaging device, the configuration and operation of the camera are apparent to a person of an ordinary skill in the art, the detailed description thereof is not provided.

The controller 130 may include one or more microprocessor operated by predetermined programs and the programs are composed of series of commands for performing the method of recognizing a lane according to an exemplary embodiment of the present invention, which is described below.

In an exemplary embodiment of the present invention, the controller 130 may include a multimedia control system configured to control the multimedia in a vehicle and a BCM (Body Control Module) that controls the electric devices for the body of a vehicle. Further, the controller 130 may include the multimedia control system and the body control module.

In the method of recognizing a lane according to an exemplary embodiment of the present invention, which is described below, it may be assumed that some processes are performed by the multimedia control system relating to an imaging device and other processes are performed by the BCM relating to the radar. However, it should not be understood that the scope of the present invention is limited to the exemplary embodiment to be described below. The controller may be implemented by a combination different from that described in an exemplary embodiment of the present invention.

Hereinafter, a method of recognizing a lane according to an exemplary embodiment of the present invention is described in detail with reference to the accompanying drawings.

Figure 3:
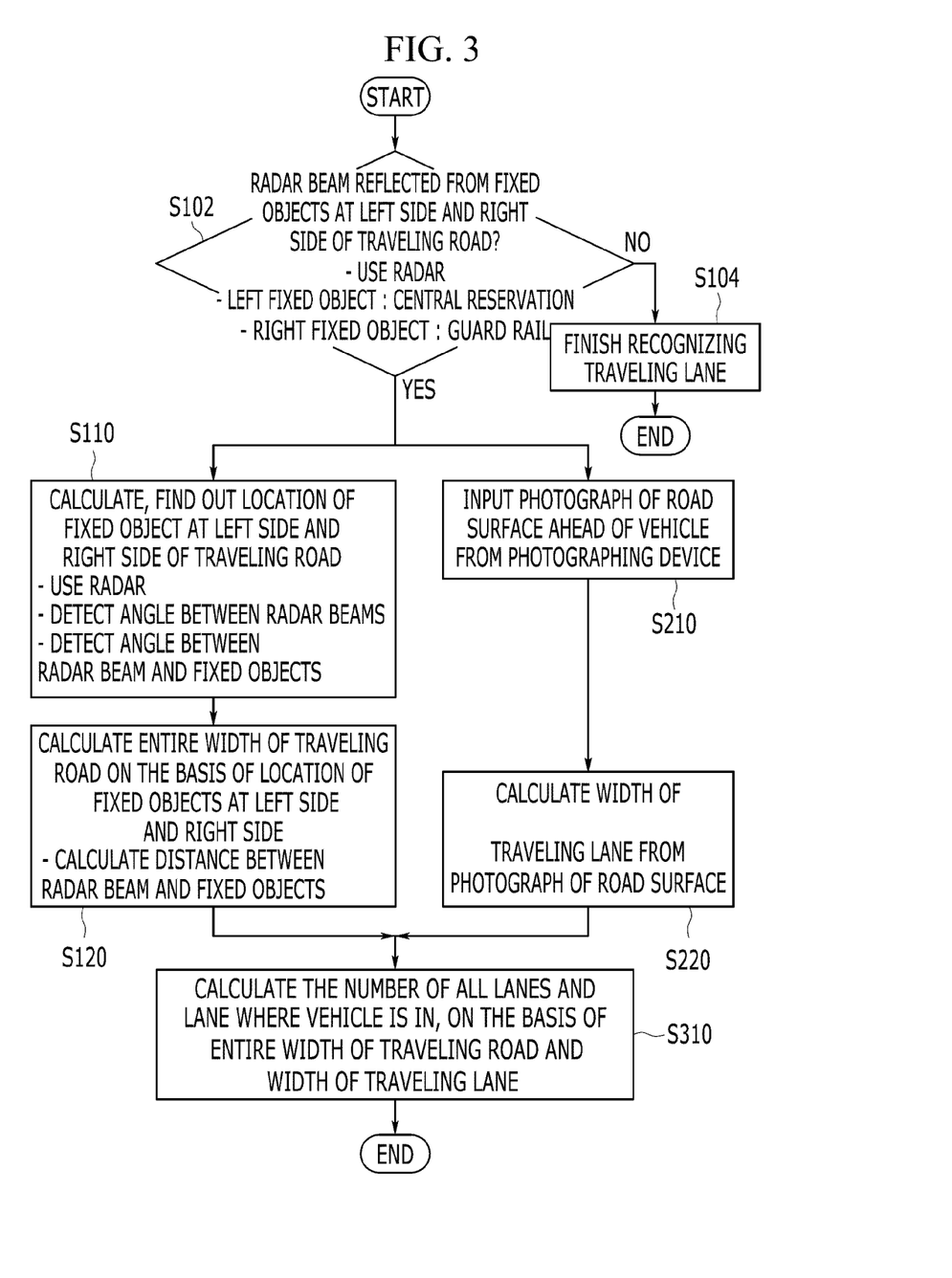
FIG. 3 is an exemplary flowchart illustrating a method of recognizing a lane according to an exemplary embodiment of the present invention.

FIG. 3 is an exemplary flowchart illustrating a method of recognizing a lane according to an exemplary embodiment of the present invention.

The method of recognizing a lane according to an exemplary embodiment of the present invention may recognize the number of all lanes of a traveling directional road (e.g., one way) and/or the lane where a vehicle is traveling in.

The method of recognizing a lane according to an exemplary embodiment of the present invention may include: detecting a location of a plurality of fixed objects 10L and 10R at a left side and/or a right side in a traveling direction using a radar 110 (S110); capturing a photograph of a road surface ahead of a vehicle 100 using an imaging device 120 (S210); calculating an entire width (Width) of the traveling road based on the locations of the fixed objects 10L and 10R at the left side and/or the right side (S120); calculating the width (Lane_W) of a traveling lane from the photograph of the road surface (S220); and calculating the lane (Current_Lane) in which the vehicle is traveling based on the calculated width (Lane_W) of the traveling lane and the entire width (Width) of the traveling road (S310).

The detection of the location of fixed objects (S110) may include: calculating an inter radar beam angle reflected and received from the fixed objects 10L and 10R at the left side and/or the right side at a predetermined distance ahead of the vehicle 100; detecting left and/or right angles (Angle_L and Angle_R) of the driving direction of the vehicle and the radar beams reflected and received from the fixed objects 10L and 10R at the left side and/or the right side at a predetermined distance ahead of the vehicle 100; and calculating the locations of the fixed objects based on the inter radar beam angle and the left and/or right angles.

Moreover, the detection the locations of fixed objects (S110) may receive only the radar beam reflected and received from the left fixed object 10L, which may be a central reservation, at a predetermined distance ahead of the vehicle, when there is no guard rail on the traveling lane, and calculate the location.

Further, the method of recognizing a lane according to an exemplary embodiment of the present invention may include finishing recognizing a traveling lane (S102 and S104), unless the radar beam is received.

The operation of the method of recognizing a lane according to an exemplary embodiment of the present invention is described in detail, as follows.

As illustrated in FIG. 3, the controller 130 may check whether there is a central reservation 10L or a guard rail 10L, which are installed at the left and right sides of a road where the vehicle 100 is traveling, by controlling the radar 110 (S102). In other words, the controller 130 may control the radar 110 to radiate a radar beam and determine whether there is the central reservation 10L and/or the guide rail 10R, which are fixed objects, based on whether a reflective wave is received. Although the central reservation is exemplified as the fixed object at the left of the vehicle 100 in an exemplary embodiment of the present invention, the scope of the present invention is not limited thereto. Furthermore, although the guard rail is exemplified as a fixed object at the right of the vehicle 100 in an exemplary embodiment of the present invention, the scope of the present invention is not limited thereto.

When any one of the reflective waves is not received to the radar 110 and any one of the reflective waves is not input to the controller 130, the controller 130 may determine a problem in the radar 110 or there is no guard rail or central reservation that are fixed objects for recognizing the traveling lane, and may complete the process of recognizing a lane according to an exemplary embodiment of the present invention (S104).

Figure 4:
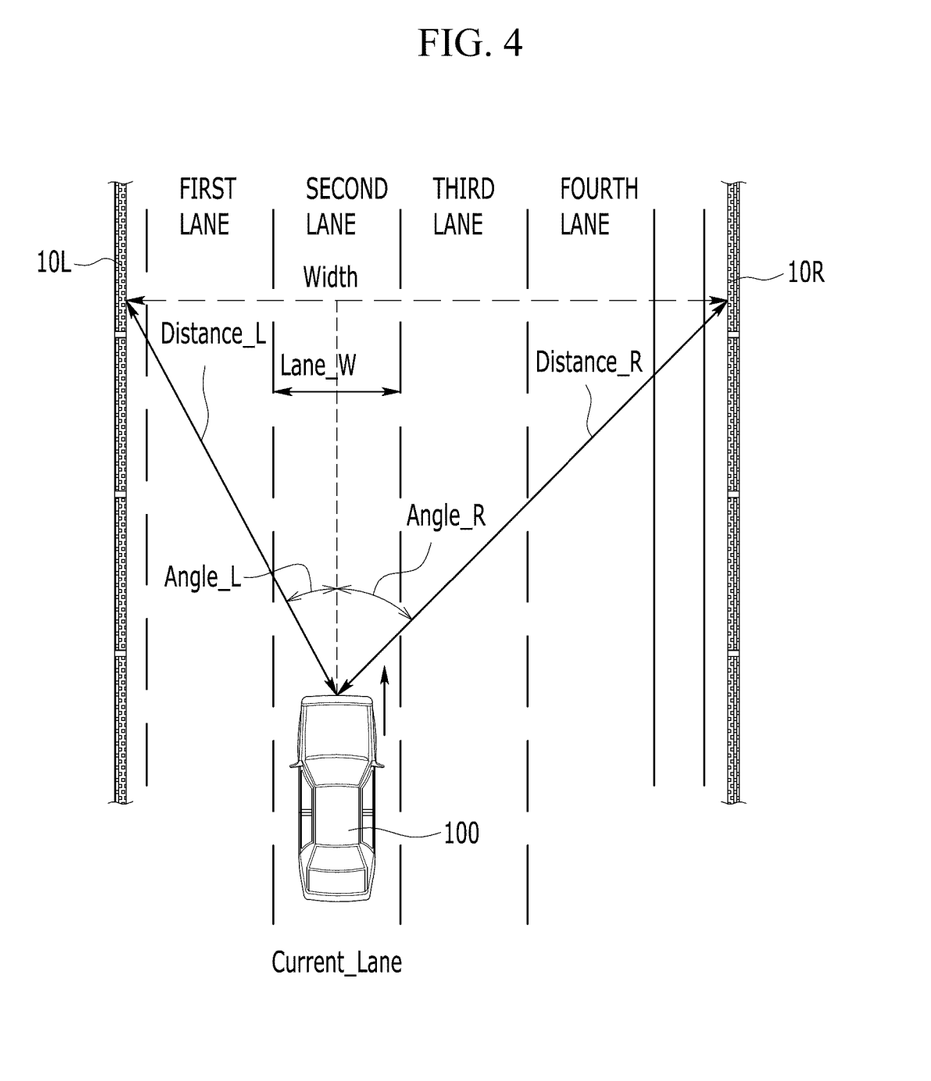
FIG. 4 is an exemplary diagram illustrating an exemplary embodiment of the present invention.

On the other hand, when the reflective wave is received by the radar 110, the controller 130 may detect the angles (Angle_L and Angle_R), as illustrated in FIG. 4, of the driving direction of the vehicle 110 and the reflective waves of the radar beams reflecting from the left and right fixed objects 10L and 10R (S110). The controller 130 may calculate and detect the locations of the left and right fixed objects 10L and 10R based on the detected angles (Angle_L and Angle_R) (S110). Additionally, the controller 130 may detect the angle between the reflective waves of the radar beams reflecting from the left and right fixed objects 10L and 10R too (S110). The detected angles may be stored in a memory (not shown). Further, the controller 130 may calculate the distances (Distance_L and Distance_R) between the radar 110 and the left and right fixed objects 10L and 10R based on the reflective waves of the radar beams. The calculated distances (Distance_L and Distance_R) may be stored in the memory (not shown).

As described above, after the angles Angle_L and Angle_R may be detected and the distances Distance_L and Distance_R may be calculated, the controller 130 may calculate and detect the entire width (Width) of the traveling directional road on which the vehicle 100 is traveling from the following equation.

$$\text{Width} = (\text{Distance\_}L * \sin(\text{Angle\_}L)) + (\text{Distance\_}R * \sin(\text{Angle\_}R)) \qquad \text{Equation 1}$$

The process of determining the angles Angle_L and Angle_R, the distances Distance_L and Distance_R, and the entire width (Width) of the road would be apparent to a person of an ordinary skill in the art, and the detailed description is not provided herein.

Figure 2:
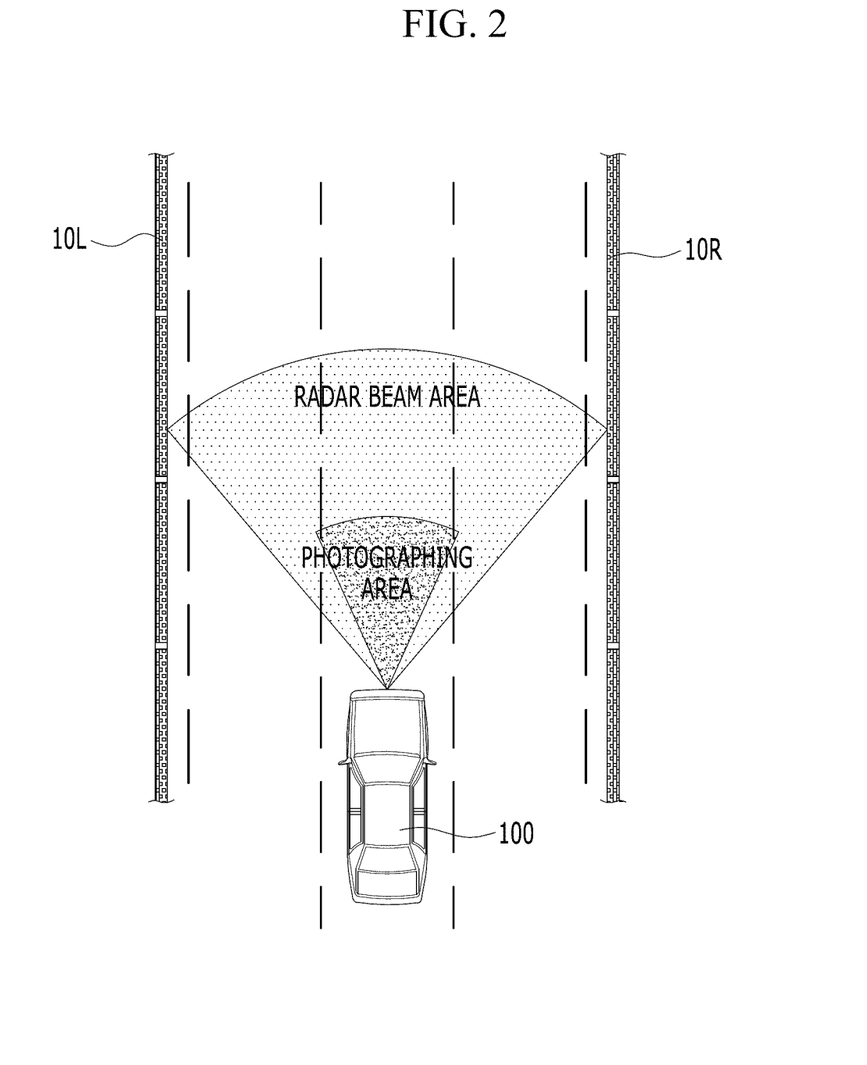
FIG. 2 is an exemplary diagram illustrating sensing areas of a radar and an imaging device that are used in a system for recognizing a lane according to an exemplary embodiment of the present invention.

On the other hand, when there are reflective waves of the radar beams from the left and right fixed objects 10L and 10R, the controller 130 may control the imaging device 120 to capture a photograph of the road surface ahead of the vehicle, as illustrated in FIG. 2. When the imaging device 120 captures a photograph of the road surface, the controller 130 may receive the photographs of the road surface from the imaging device 120 (S210). When the photograph of the road surface is input to the controller 130, the controller 130 may calculate the width between lanes, that is, the lane width (Lane_W) from the input photograph of the road surface (S220). The calculated lane width (Lane_W) may be stored in the memory (not shown).

After the angles Angle_L and Angle_R, the distances Distance_L and Distance_R, the entire width (Width) of the road, and the lane width (Lane_W) are determined, the controller 130 may calculate and determine the number of lanes (Total_Lane) of the traveling directional road (e.g., one way) and the current lane (Current_Lane) in which the vehicle 100 is traveling, based on the values, from the following equations.

Total_Lane=(Width)/(Lane_W)

(Current_Lane−0.5)*Lane_W=Distance_L*sin(Angle_L)     Equations 2 and 3:

In determining the number of lanes (Total_Lane), the integer of the quotient may be the number of all the lanes and the numbers after the decimal point may be the width of a shoulder not included in the lanes.

Although it is exemplified above that there are both left and right fixed objects 10L and 10R, that is, there is both a central reservation and a guard rail, when there is only a central reservation without a guard rail as another example of an exemplary embodiment of the present invention, it may not be possible to calculate the number of all the lanes, but it may be possible to calculate the current lane in which the vehicle is traveling. In other words, the controller 130 may sequentially determine the lane numbers from the lane closest to the location of the central reservation, by checking the location of the central reservation using the radar 110 and determining the lane width using the imaging device 120.

As another example of an exemplary embodiment of the present invention, it may be possible to sequentially determine the lane numbers when there is only the central reservation without a guard rail, such that it may be possible to improve the performance of a navigation device by using the information for navigation.

Therefore, according to an exemplary embodiment of the present invention, it may be possible to recognize the entire width of a traveling road and the lane in which a vehicle is traveling, by using a radar and an imaging device. As described above, the information about the number of lanes of a traveling road and the current lane in which a vehicle is traveling, which are recognized as described above, may be used for a navigation device and a lane change system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lane recognition method of recognizing a lane in which a vehicle is traveling, comprising:

detecting, by a radar, a plurality of locations of a plurality of fixed objects at a left side and a right side of a traveling directional road;

calculating, by the controller, an inter radar beam angle of a plurality of radar beams reflected and received from the fixed objects at the left side and the right side at a predetermined distance ahead of the vehicle;

detecting, by the controller, left and right angles of a driving direction of the vehicle and the plurality of radar beams reflected and received from the fixed objects at the left side and the right side at the predetermined distance ahead of the vehicle;

calculating, by the controller, the plurality of locations of the fixed objects based on the inter radar beam angle and the left and right angles;

capturing, by an imaging device, a photograph of a road surface ahead;

calculating, by a controller, the entire width of the traveling directional road based on the locations of the fixed objects at the left side and the right side;

calculating, by the controller, the width of a traveling lane from the photograph of the road surface; and calculating, by the controller, the lane in which the vehicle is traveling based on the calculated width of the traveling lane and the entire width of the traveling directional road.

2. The method of claim 1, wherein the left fixed object is a central reservation and the right fixed object is a guard rail, wherein the method further comprises canceling recognizing a traveling lane, when the radar beam is not received.

3. The method of claim 1, wherein the calculating of the entire width of the traveling road includes:

calculating, by the controller, the distances between the radar and the left and right fixed objects from the reflected and received radar beams; and determining, by the controller, the entire width of the traveling road from the following equation Width=(Distance_L*sin(Angle_L))+(Distance_R*sin(Angle_R)), wherein Width is the entire width of the traveling road, Distance_L and Distance_R are the distances between the radar and the left and right fixed objects, and Angle_L and Angle_R are the left and right angles.

4. The method of claim 3, wherein the calculating of a lane in which the vehicle is traveling includes calculating, by the controller, the number of traveling lanes based on the calculated width of the traveling lane and entire width of the traveling road.

5. The method of claim 4, wherein the calculating of the number of lanes of the traveling road has the integer of the quotient obtained by dividing the entire width of the traveling road by the width of the traveling lane as the number of lanes.

6. The method of claim 3, wherein the calculating of the lane in which the vehicle is traveling uses the following equation:

(Current_Lane−0.5)*Lane_W=Distance_L*sin(Angle_L), wherein Current_Lane is the lane in which the vehicle is traveling, Lane_W is the calculated lane width, Distance_L is the distance between the radar and the left fixed objects, and Angle_L is the left angle.

7. A system for recognizing a lane, comprising:
a radar mounted on a vehicle, wherein the radar is configured to detect a plurality of locations of a plurality of fixed objects at a left side and a right side of a road;
an imaging device mounted on the vehicle, wherein the imaging device is configured to capture a photograph of a road surface of the road; and
a controller configured to:
calculate an inter radar beam angle of a plurality of radar beams reflected and received from the fixed objects at the left side and the right side at a predetermined distance ahead of the vehicle;
detect left and right angles of a driving direction of the vehicle and the plurality of radar beams reflected and received from the fixed objects at the left side and the right side at the predetermined distance ahead of the vehicle;
calculate the plurality of locations of the fixed objects based on the inter radar beam angle and the left and right angles;
calculate the entire width of a traveling directional road based on the locations of the fixed objects at the left side and the right side;
calculate the width of a traveling lane from the photograph of the road surface; and
calculate the lane in which the vehicle is traveling based on the calculated width of the traveling lane and the entire width of the traveling directional road.

8. The system of claim 7, wherein the left fixed object is a central reservation, and the right fixed object is a guard rail.

9. The system of claim 7, wherein the controller is further configured to:
calculate the distances between the radar and the left and right fixed objects form the reflected and received radar beams; and
determine the entire width of the traveling road from the following equation:

$$\text{Width} = (\text{Distance}\_L * \sin(\text{Angle}\_L)) + (\text{Distance}\_R * \sin(\text{Angle}\_R)),$$

wherein Width is the entire width of the traveling road, Distance_L and Distance_R are the distances between the radar and the left and right fixed objects, and Angle_L and Angle_R are the left and right angles.

10. The system of claim 7, wherein the controller is further configured to:
calculate the number of traveling lanes based on the calculated width of the traveling lane and the entire width of the traveling road; and
calculate the lane in which the vehicle is traveling using the following equation:

$$(\text{Current\_Lane} - 0.5) * \text{Lane}\_W = \text{Distance}\_L * \sin(\text{Angle}\_L),$$

wherein Current_Lane is the lane in which the vehicle is traveling, Lane_W is the calculated lane width, Distance_L is the distance between the radar and the left fixed objects, and Angle_L is the left angle.

11. A non-transitory computer readable medium containing program instructions which, when executed by a controller, cause the processor to:
control a radar mounted on a vehicle to detect a plurality of locations of a plurality of fixed objects at a left side and a right side of a road;
calculate an inter radar beam angle of a plurality of radar beams reflected and received from the fixed objects at the left side and the right side at a predetermined distance ahead of the vehicle;
detect left and right angles of a driving direction of the vehicle and the plurality of radar beams reflected and received from the fixed objects at the left side and the right side at the predetermined distance ahead of the vehicle;
calculate the plurality of locations of the fixed objects based on the inter radar beam angle and the left and right angles;
calculate the entire width of a traveling directional road based on the plurality of locations of the fixed objects detected at the left side and the right side of the traveling directional road;
calculate the width of a traveling lane from a photograph of a road surface captured by an imaging device; and
calculate the lane in which the vehicle is traveling based on the calculated width of the traveling lane and the entire width of the traveling directional road.

12. The computer readable medium of claim 11, wherein the left fixed object is a central reservation and the right fixed object is a guard rail and the program instructions further cause the processor to cancel recognizing a traveling lane, when the radar beam is not received.

13. The computer readable medium of claim 11, wherein the program instructions further cause the processor to:
calculate the distances between the radar and the left and right fixed objects from the reflected and received radar beams; and
determine the entire width of the traveling road from the following equation $$\text{Width} = (\text{Distance}\_L * \sin(\text{Angle}\_L)) + (\text{Distance}\_R * \sin(\text{Angle}\_R)),$$

wherein Width is the entire width of the traveling road, Distance_L and Distance_R are the distances between the radar and the left and right fixed objects, and Angle_L and Angle_R are the left and right angles.

14. The computer readable medium of claim 11, wherein the program instructions further cause the processor to:
calculate the number of traveling lanes based on the calculated width of the traveling lane and the entire width of the traveling road; and
calculate the lane in which the vehicle is traveling using the following equation:

$$(\text{Current\_Lane} - 0.5) * \text{Lane}\_W = \text{Distance}\_L * \sin(\text{Angle}\_L),$$

wherein Current_Lane is the lane in which the vehicle is traveling, Lane_W is the calculated lane width, Distance_L is the distance between the radar and the left fixed objects, and Angle_L is the left angle.

* * * * *